(12) United States Patent
Fear

(10) Patent No.: US 9,813,254 B2
(45) Date of Patent: Nov. 7, 2017

(54) SYSTEM AND METHOD FOR PROVIDING REAL-TIME ASSISTANCE REGARDING A CLOUD-BASED APPLICATION

(71) Applicant: Nvidia Corporation, Santa Clara, CA (US)

(72) Inventor: Andrew Fear, Austin, TX (US)

(73) Assignee: Nvidia Corporation, Santa Clara, CA (US)

( * ) Notice: Subject to any disclaimer, the term of this patent is extended or adjusted under 35 U.S.C. 154(b) by 720 days.

(21) Appl. No.: 14/017,695

(22) Filed: Sep. 4, 2013

(65) Prior Publication Data
US 2015/0067745 A1    Mar. 5, 2015

(51) Int. Cl.
*H04L 12/18* (2006.01)
*H04N 7/15* (2006.01)
*A63F 13/00* (2014.01)

(52) U.S. Cl.
CPC .......... *H04L 12/1813* (2013.01); *A63F 13/00* (2013.01); *H04L 12/1827* (2013.01); *H04N 7/155* (2013.01)

(58) Field of Classification Search
CPC ..... H04L 12/1813; A63F 13/00; H04N 7/155; H04N 7/17318; H04N 21/6125; H04N 21/2225; H04N 21/6175; H04N 21/47202
USPC ............................................. 345/522; 725/93
See application file for complete search history.

(56) References Cited

U.S. PATENT DOCUMENTS

| | | | |
|---|---|---|---|
| 2006/0282774 A1* | 12/2006 | Covell | H04N 7/17318 715/716 |
| 2011/0086706 A1* | 4/2011 | Zalewski | A63F 13/06 463/36 |
| 2012/0102418 A1* | 4/2012 | Joy | G06F 17/241 715/762 |
| 2013/0106989 A1* | 5/2013 | Gage | H04N 7/152 348/14.09 |

(Continued)

OTHER PUBLICATIONS

Hsin-Chia Fu, "Interactive Video Platform for E-learning and Remote Services", IJCSI International Journal of Computer Science Issues, vol. 10, Issue 1, No. 1, pp. 154-161, Jan. 2013.*

*Primary Examiner* — Gregory J Tryder
*Assistant Examiner* — Michael Le
(74) *Attorney, Agent, or Firm* — Kevin Brown; Parker Justiss, P.C.

(57) ABSTRACT

A system and method for providing real-time assistance regarding a cloud-based application and an application server incorporating the system or the method. In one embodiment, the system includes: (1) an assistance request receiver operable to receive from a user requesting assistance an assistance request regarding the cloud-based application, (2) a rendered video stream diverter associated with the assistance request receiver and operable to reroute an original rendered video stream associated with the user requesting assistance to a user providing assistance and (3) a modification receiver associated with the assistance request receiver and operable to receive from the user providing assistance at least one modification regarding the original rendered video stream, a stream transmitter associated with the modification receiver operable to transmit a modified rendered video stream toward the user requesting assistance that has been modified based on the at least one modification.

20 Claims, 4 Drawing Sheets

(56) References Cited

U.S. PATENT DOCUMENTS

2014/0208163 A1* 7/2014 Domke .............. G05B 23/0208
714/37
2015/0238859 A1 8/2015 Fear

* cited by examiner

SYSTEM AND METHOD FOR PROVIDING REAL-TIME ASSISTANCE REGARDING A CLOUD-BASED APPLICATION

TECHNICAL FIELD

This application is directed, in general, to cloud computing and, more specifically, to a system and method for providing real-time assistance regarding a cloud-based application.

BACKGROUND

The utility of personal computing was originally focused at an enterprise level, putting powerful tools on the desktops of researchers, engineers, analysts and typists. That utility has evolved from mere number-crunching and word processing to highly programmable, interactive workpieces capable of production level and real-time graphics rendering for incredibly detailed computer aided design, drafting and visualization. Personal computing has more recently evolved into a key role as a media and gaming outlet, fueled by the development of mobile computing. Personal computing is no longer resigned to the world's desktops, or even laptops. Robust networks and the miniaturization of computing power have enabled mobile devices, such as cellular phones and tablet computers, to carve large swaths out of the personal computing market. Desktop computers remain the highest performing personal computers available and are suitable for traditional businesses, individuals and garners. However, as the utility of personal computing shifts from pure productivity to envelope media dissemination and gaming, and, more importantly, as media streaming and gaming form the leading edge of personal computing technology, a dichotomy develops between the processing demands for "everyday" computing and those for high-end gaming, or, more generally, for high-end graphics rendering in a multi-user, multi-scene environment.

The processing demands for high-end graphics rendering drive development of specialized hardware, such as graphics processing units (GPUs) and graphics processing systems (graphics cards). For many users, high-end graphics hardware would constitute a gross under-utilization of processing power. The rendering bandwidth of high-end graphics hardware is simply lost on traditional productivity applications and media streaming. Cloud graphics processing is a centralization of graphics rendering resources aimed at overcoming the developing misallocation.

In cloud architectures, similar to conventional media streaming, graphics content is stored, retrieved and rendered on a server where it is then encoded, packetized and transmitted over a network to a client associated with a user as a video stream (often including audio). The client simply decodes the video stream and displays the content. High-end graphics hardware is thereby obviated on the client end, which requires only the ability to play video. Graphics processing servers centralize high-end graphics hardware, enabling the pooling of graphics rendering resources where they can be allocated appropriately upon demand. Furthermore, cloud architectures pool storage, security and maintenance resources, which provide users easier access to more up-to-date content than can be had on traditional personal computers.

Perhaps the most compelling aspect of cloud architectures is the inherent cross-platform compatibility. The corollary to centralizing graphics processing is offloading large complex rendering tasks from client platforms. Graphics rendering is often carried out on specialized hardware executing proprietary procedures that are optimized for specific platforms running specific operating systems. Cloud architectures need only a thin-client application that can be easily portable to a variety of client platforms. This flexibility on the client side lends itself to content and service providers who can now reach the complete spectrum of personal computing consumers operating under a variety of hardware and network conditions.

SUMMARY

One aspect provides a system for providing real-time assistance regarding a cloud-based application. In one embodiment, the system includes: (1) an assistance request receiver operable to receive from a user requesting assistance an assistance request regarding the cloud-based application, (2) a rendered video stream diverter associated with the assistance request receiver and operable to reroute an original rendered video stream associated with the user requesting assistance to a user providing assistance and (3) a modification receiver associated with the assistance request receiver and operable to receive from the user providing assistance at least one modification regarding the original rendered video stream, a stream transmitter associated with the modification receiver operable to transmit a modified rendered video stream toward the user requesting assistance that has been modified based on the at least one modification.

Another aspect provides a method of providing real-time assistance regarding a cloud-based application. In one embodiment, the method includes: (1) receiving from a user requesting assistance an assistance request regarding the cloud-based application, (2) rerouting an original rendered video stream associated with the user requesting assistance to a user providing assistance, (3) receiving from the user providing assistance at least one modification regarding the original rendered video stream and (4) transmitting a modified rendered video stream toward the user requesting assistance that has been modified based on the at least one modification.

Yet another embodiment provides an application server. In one embodiment, the application server includes: (1) an application core executable on a central processing unit, (2) a video renderer associated with the application core and executable on a graphics processing unit, (3) a stream transmitter associated with the video renderer and operable to transmit a plurality of video streams toward application users, (4) an assistance request receiver associated with the application core and operable to receive from a user requesting assistance an assistance request regarding a cloud-based application, (5) a rendered video stream diverter associated with the stream transmitter and operable to reroute an original rendered video stream associated with the user requesting assistance to a user providing assistance and (6) a modification receiver associated with the application core and operable to receive from the user providing assistance at least one modification regarding the original rendered video stream, the stream transmitter further operable to transmit a modified rendered video stream toward the user requesting assistance that has been modified based on the at least one modification.

BRIEF DESCRIPTION

Reference is now made to the following descriptions taken in conjunction with the accompanying drawings, in which.

DETAILED DESCRIPTION

Figure 1:
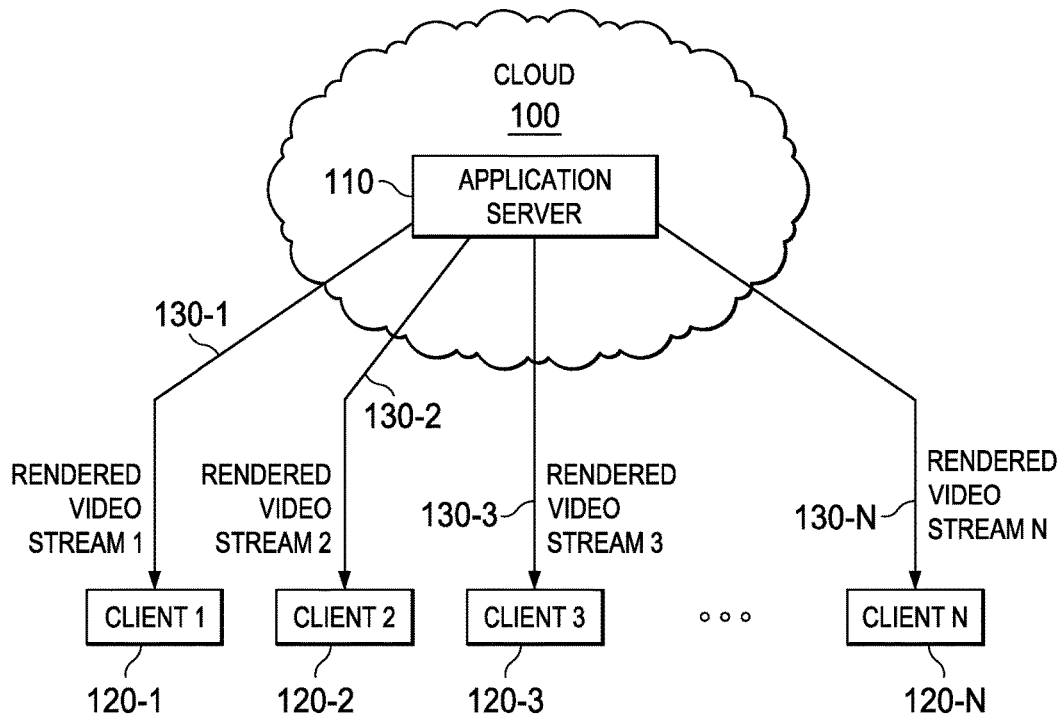
FIG. 1 is a diagram of one embodiment of a cloud application environment involving multiple application users.

As the Background above implies, cloud-based applications are popular. Their popularity is likely to continue growing as Internet processing, storage and transport resources grow. Cloud-based games are particularly popular, because they can involve many players interacting with each other in real-time, enhancing their unpredictability and hence reality.

As those skilled in the pertinent art are aware, users of applications occasionally want assistance. For example, a user of a word processor may desire help with a rarely-used or unintuitive command, or a game player may seek the guidance of a more skilled player with respect to what to do at a particularly tricky juncture or level. To address this need, all manner of conventional help is available in the form of books, magazines, web pages, videos, maps, user forums and chats. However, as those skilled in the art are also aware, users need to travel to a bookstore or open a browser to gain access to an Internet-based source of assistance. The user is thus faced with interrupting (typically pausing or terminating) his or her use of the application to seek help. Sometimes the interruption is tolerable. In the case of a game, the interruption can harm play. In the case of a multi-player game, the interruption have terminal effect.

Furthermore, the aid that is conventionally available is likely not to be exactly on-point. For example, a game solution manual may describe an action that a game player should take at a particular point in a game, but not illustrate it. Likewise, the information may be incomplete, out-of-date, out-of-context or a combination of the above. Consequently, getting relevant, effective, understandable help with a cloud-based application may take significant time and resourcefulness. As a practical matter, receiving such help without having to turn one's attention away from a cloud-based application is only conventionally possible when a more experienced user is looking over the shoulder of the user seeking assistance.

It is realized herein that the conventional mechanisms by which users seek and receive assistance could be improved. It is also realized herein that the centralized nature of cloud-based applications lends itself to a fundamentally novel and more powerful mechanism for requesting and providing assistance with the application. It is further realized herein that the assistance should be able to take different forms to yield flexibility, power and clarity to the assistance being given.

Accordingly, introduced herein are various embodiments of a system and method for providing real-time assistance regarding a cloud-based application. The embodiments generally provide a way for a first user to request assistance via the cloud, a way for a second user to view the rendered video stream that the first user is seeing and modify that stream to provide the assistance, and a way for the first user to receive the assistance by viewing the modified stream. In various embodiments, the second user may provide the assistance by one or more of adding visual cues, such as text comments or graphical characters, adding audible assistance, such as narration, and issuing commands to the application, such as temporarily taking the place of the first user in playing a game so he or she can see how it may be played. These and other embodiments will now be described in detail.

FIG. 1 is a diagram of one embodiment of a cloud application environment involving multiple application users. FIG. 1 illustrates a cloud 100 representing a collection of computing, storage and transmission resources. The Internet is one example of a cloud. One computing and storage resource is shown particularly in the cloud 100, namely an application server 110. The application server 110 is operable to execute a cloud application which may be a productive application, such as a word processor, spreadsheet, database manager or multimedia editor, or an entertainment application, such as a social interaction tool or a game. The invention is not limited to a particular type or category of cloud application.

In executing on the application server 110, the cloud application makes use of the computing and storage resources therein. In the illustrated embodiment, the application server 110 has at least one central processing unit (CPU) and at least one graphics processing unit (GPU). As described in the Background above, cloud applications are characterized in that their video output is rendered on the application server to yield multiple video streams, typically individualized for each user of the cloud application. Accordingly, the cloud application of FIG. 1 employs the CPU of the application server 110 to execute its core (the principal functions of the cloud application that users invoke) and the GPU of the application server 110 to render video streams representing views by the users of the output of the cloud application.

Accordingly, FIG. 1 shows a plurality of client systems, namely Client 1 120-1, Client 2 120-2, Client 3 120-3, and so on, through Client N 120-N. While the invention is not limited to a particular number of client systems, there should be more than one client system. It is assumed for the purposes of FIG. 1 that an application user corresponds to each one of the client systems Client 1 120-1, Client 2 120-2, Client 3 120-3, and so on, through Client N 120-N.

FIG. 1 shows a plurality of rendered video streams Stream 1 130-1, Stream 2 130-2, Stream 3 130-3, and so on, through Stream N 130-N leading from the application server to their corresponding client systems Client 1 120-1, Client 2 120-2, Client 3 120-3, and so on, through Client N 120-N. Omitted from FIG. 1 for clarity's sake are paths from the client systems Client 1 120-1, Client 2 120-2, Client 3 120-3, and so on, through Client N 120-N back to the application server 110 along which commands issued by the various application users via the client systems Client 1 120-1, Client 2 120-2, Client 3 120-3, and so on, through Client N 120-N may travel to allow the application users to interact with the cloud application.

Figure 2:
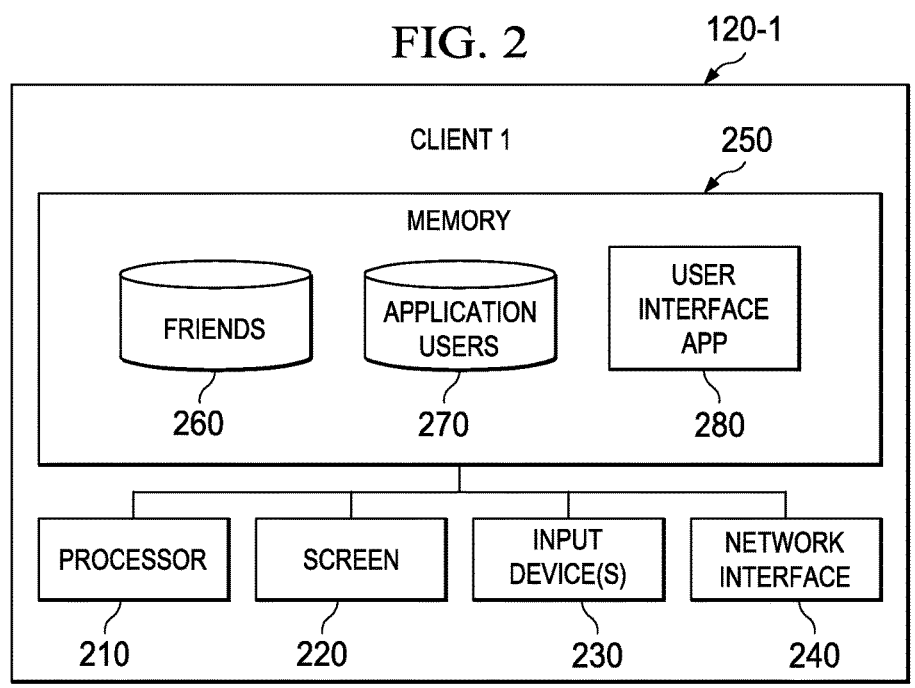
FIG. 2 is a diagram of one embodiment of a client system employable in the cloud application environment of FIG. 1.

FIG. 2 is a diagram of one embodiment of a client system (e.g., Client 1 120-1) employable in the cloud application environment of FIG. 1. The client system includes a processor 210, a screen 220, one or more input devices 230, a network interface 240 and a memory 250. The client system may be a mobile device, such as a Smartphone, an eReader, a tablet computer, a laptop computer or other portable device capable of interacting with a cloud via a network. The client system may alternatively be a nonmobile device, such as a desktop computer, a workstation or a game console. The invention is not limited to a particular type or make of client system.

The client system is operable to interact with a cloud application via a user interface application, or "app" 280. The app may be as general-purpose as a commercially available web browser or may be tailored or custom-designed for a particular cloud application. The client system may also contain data identifying friends or other users of the cloud application in a friends database 260 or an application users database 270. In alternative embodiments, one or both of the databases 260, 270 are stored in the application server (110 of FIG. 1).

Figure 3:
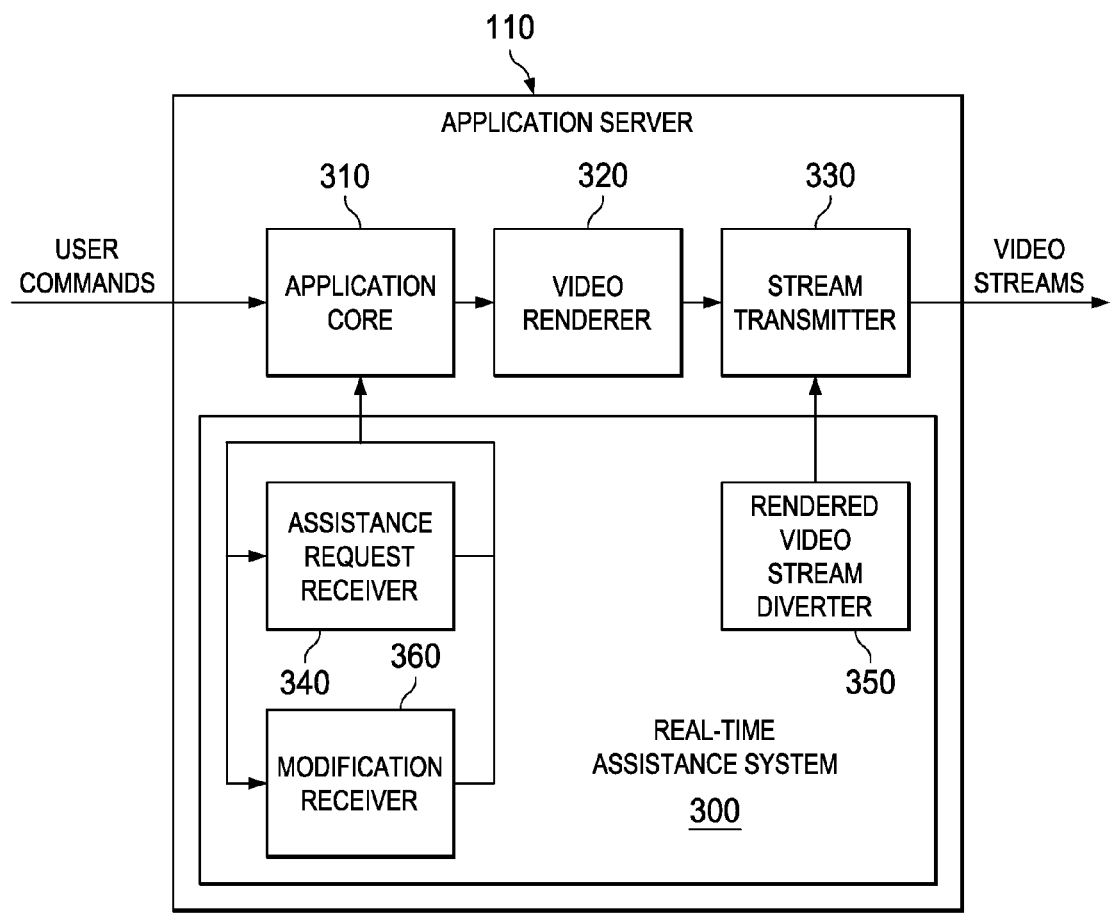
FIG. 3 is a diagram of one embodiment of an application server employable in the cloud application environment of FIG. 1.

FIG. 3 is a diagram of one embodiment of an application server employable in the cloud application environment of FIG. 1. The application server 110 is shown as executing a cloud application that includes an application core 310, a video renderer 320 and a stream transmitter 330. As stated above, the application core 310 typically executes on a CPU of the application server 110 and is operable to carry out one or more substantive functions that characterize the cloud application. For example, the substantive functions may be text manipulation functions if the cloud application is a word processor or gamespace manipulation functions if the cloud application is a game. The video renderer 320 typically executes on the GPU of the application server 110 and is operable to render views of the output of the cloud application to its users. For example, the video renderer 320 may render views of different documents for different cloud word processing users or different views of a shared gamespace for the multiple players of a cloud game. In one embodiment, the video renderer 320 employs GRID™ technology commercially available from Nvidia Corporation of Santa Clara, Calif. The stream transmitter 330 is operable to cause each of the rendered video streams to be transmitted to the client system corresponding to each of the application users. Arrows in FIG. 3 indicate a typical data flow in which the application core 310 receives user commands from application users. The video renderer 320 renders views of the output of the application core 310 as video streams. The stream transmitter 330 is responsible for routing the video streams to their respective application users.

FIG. 3 also shows one embodiment of a system 300 for providing real-time assistance regarding a cloud-based application. The embodiment of FIG. 3 includes an assistance request receiver 340. The assistance request receiver 340 is operable to receive from a "user requesting assistance" an assistance request regarding the cloud-based application. The "user requesting assistance" is simply one of the application users that has indicated his or her desire to be helped.

For purposes of FIG. 3, it is assumed that another application user (a "user providing assistance") has responded to the request from the user requesting assistance. Accordingly, a rendered video stream diverter 350 is associated with the assistance request receiver 340 in the system 300. The rendered video stream diverter 350 is operable to reroute an original rendered video stream associated with the user requesting assistance to the user providing assistance. In the illustrated embodiment, the rendered video stream diverter 350 provides a different destination address for the original rendered video stream associated with the user requesting assistance to the stream transmitter 330.

In the illustrated embodiment, the rendered video stream diverter 350 further causes a rendered video stream that has been modified in accordance with at least one modification received from the user providing assistance to be routed to the user requesting assistance. In one embodiment, the rendered video stream diverter 350 communicates with the application core 310 to instantiate the modified rendered video stream. This would likely be the case were the modifications made by the user providing assistance such that the application core should apply the modifications (e.g., commands or other modifications that alter a document or the gamespace). In an alternative embodiment, the rendered video stream diverter 350 communicates with the video renderer 320 to instantiate the modified rendered video stream. This would likely be the case were the modifications made by the user to involve mere superimpositions of visual cues, such as text comments or graphical characters, or superpositions of audible assistance on an otherwise unmodified view. This embodiment is advantageous in that the novel remote assistance feature may be provided with respect to a cloud application without having to modify the cloud application to accommodate it. Thus legacy cloud applications may be enhanced without recoding to provide the feature.

The system 300 further includes a modification receiver 360 associated with the assistance request receiver 340. The modification receiver 360 is operable to receive from the user providing assistance at least one modification regarding the original rendered video stream. In one embodiment, the at least one modification is contained in a complete video stream constructed using the frames of the original video stream. In an alternative embodiment, the at least one modification is contained in an incremental video stream representing differences to be applied to the frames of the original video stream. Those skilled in the pertinent art are familiar with incremental frames in the context of video compression or transmission. In another alternative embodiment, the at least one modification takes the form of at least one command and is not contained in a video stream. The at least one modification may then be applied by the application core 310 or the video renderer 320 as appropriate. The stream transmitter 330 is then operable to transmit the modified rendered video stream toward the user requesting assistance.

It will be recalled that FIG. 2 includes databases 260, 270 for friends and other application users. In one embodiment, the user requesting assistance employs one or both of these databases 260, 270 to request assistance. For example, the user requesting assistance may want to request assistance from his or her friends. Accordingly, the friends database 260 is employed to multicast requests for assistance to friends of the user requesting assistance (ostensibly reaching only those who happen to be online at the time the request is made). Alternatively, request may be sent to friends who also happen to be current application users at the time, which would involve both the friends database 260 and the application users database 270. Of course, the user requesting assistance may not be choosy and elect to send a request to all current application users, which would involve only the application users database 270. Those skilled in the art will doubtlessly perceive other advantageous configurations for limiting or expanding the realm of potential users capable of being approached for assistance.

Figure 4:
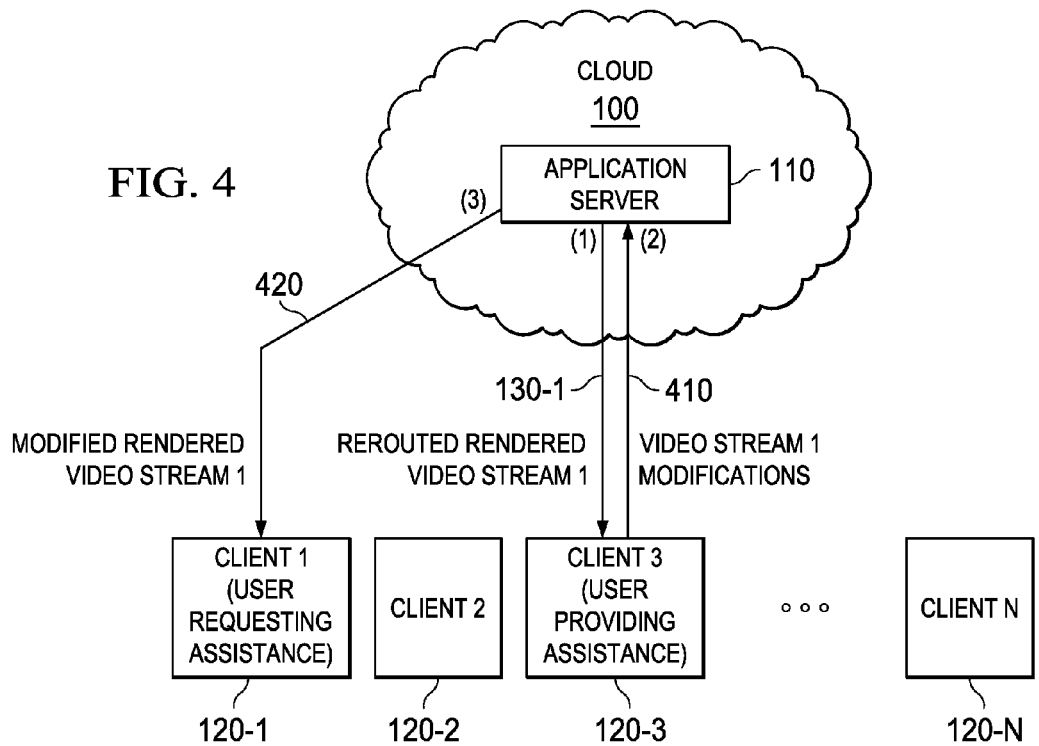
FIG. 4 is a diagram of one embodiment of a method of providing real-time assistance regarding a cloud-based application.

FIG. 4 is a diagram of one embodiment of a method of providing real-time assistance regarding a cloud-based application. FIG. 4 is like FIG. 1. However, FIG. 4 is presented primarily for the purpose of illustrating data flow as assistance is provided. FIG. 4 assumes Client 1 120-1 is the user requesting assistance and Client 3 120-3 is the user providing assistance. FIG. 4 further assumes that the user requesting assistance has requested assistance and the user providing assistance has agreed to provide assistance.

A first data flow (1) represents a rerouting of the rendered video stream that would ordinarily be sent to the user requesting assistance. Thus Stream 1 130-1 is instead provided to Client 3 120-3. A second data flow (2) represents one or more modifications 410 that the user providing assistance makes to the Stream 1 130-1 and provides to the application server 110. The one or more modifications 410 may involve the addition of visual cues, auditory assistance, outright commands to manipulate the cloud application and thereby modify its output or other modifications that may be suitable to lend assistance in the context of a particular cloud application. The invention is not limited to a particular type or number of types of modifications. A third data flow (3) represents the modified rendered video stream that results from application by the application server 110 of the one or more modifications 410 provided by the user providing assistance. Thus a modified Stream 1 420 is transmitted by the application server 110 toward the Client 1 120-1.

Figure 5:
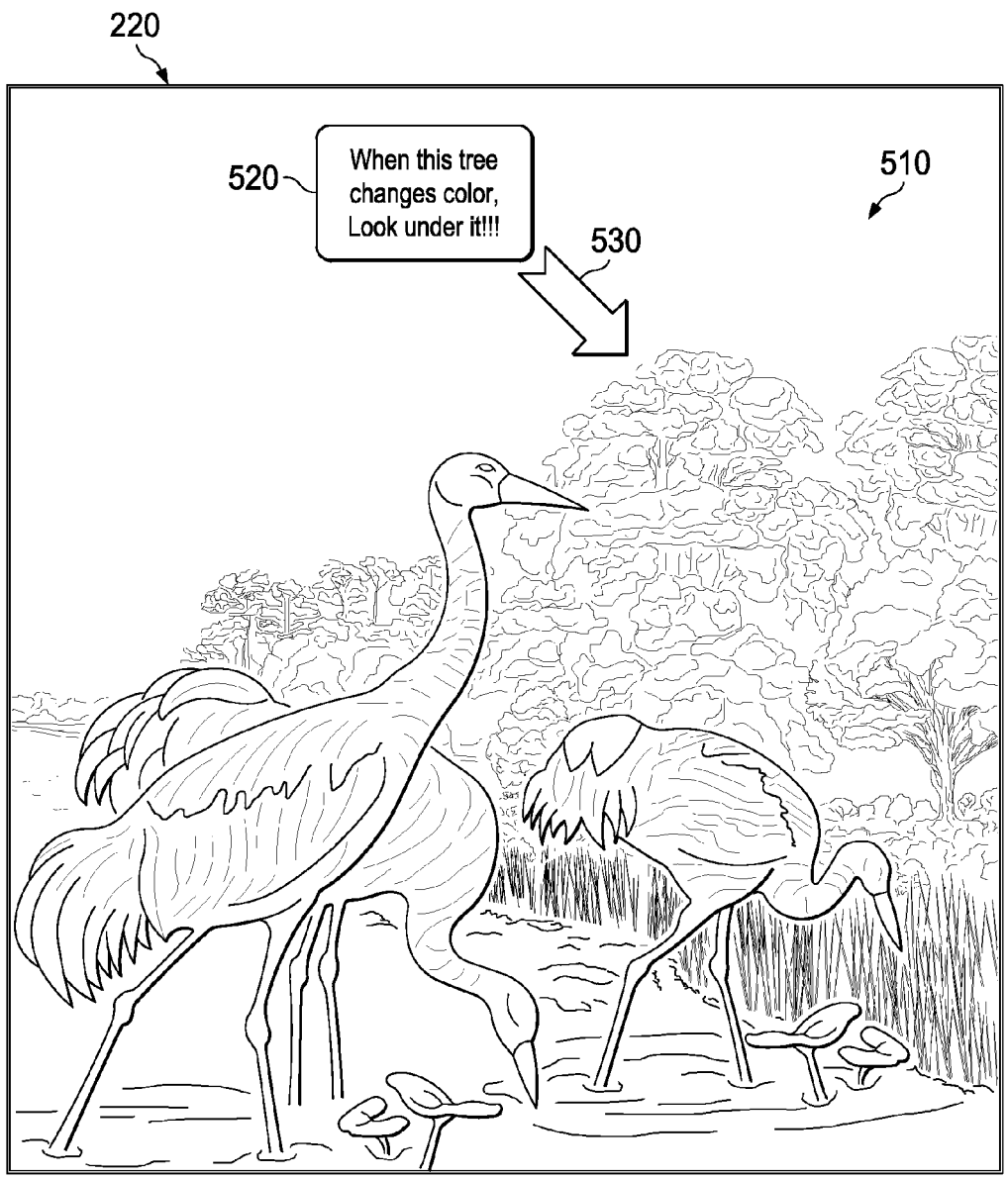
FIG. 5 is a screen-shot of one embodiment of a frame of a modified rendered video stream having superimposed visual cues providing real-time assistance.

FIG. 5 is a screen-shot of the screen 220 of FIG. 2 displaying one embodiment of a frame 510 of a modified rendered video stream having superimposed visual cues 520, 530 providing real-time assistance. The frame 510 arbitrarily represents a view of a game of some type involving jungle adventure. The visual cue 520 takes the form of a text comment located in a text box, bubble or balloon. The visual cue 530 takes the form of a graphical character (specifically an arrow) pointing to a tree that becomes important to game play when it changes color. Those skilled in the pertinent art should understand that assistance may involve the visual cue 520 and not the visual cue 530 (or vice versa), additional visual cues located at various positions in the frame 510 or auditory assistance with or without visual cues. Alternatively or additionally, the user providing assistance may be allowed to or decide on his or her own to take over game play and provide commands to the cloud application on behalf of the user requesting assistance.

Figure 6:
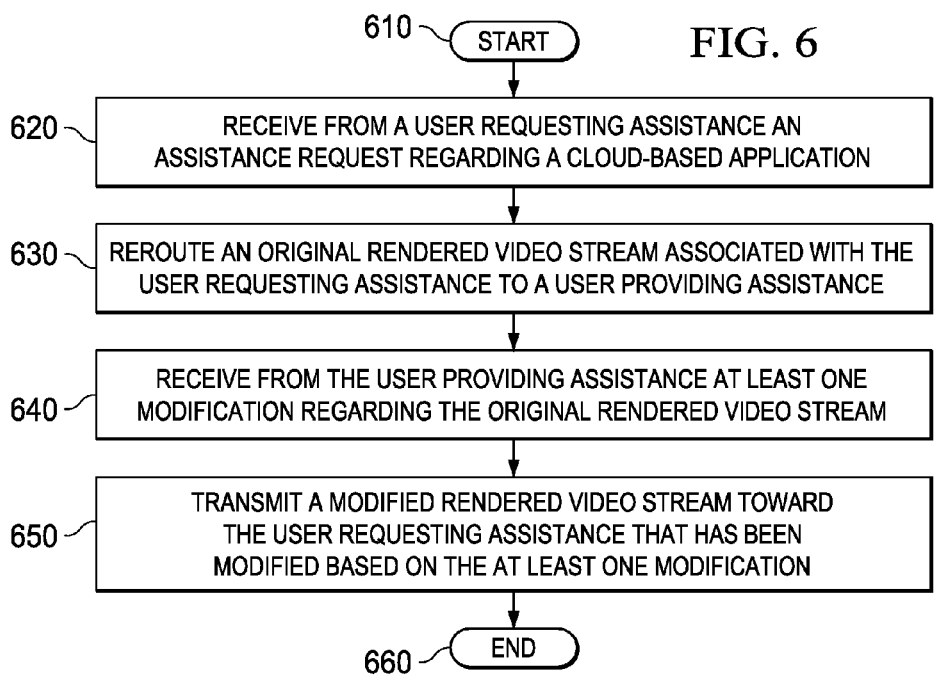
FIG. 6 is a flow diagram of one embodiment of a method of providing real-time assistance regarding a cloud-based application.

FIG. 6 is a flow diagram of one embodiment of a method of providing real-time assistance regarding a cloud-based application. The method begins in a start step 610. In a step 620, an assistance request regarding a cloud-based application is received from a user requesting assistance. In a step 630, an original rendered video stream associated with the user requesting assistance is rerouted to a user providing assistance. In a step 640, at least one modification regarding the original rendered video stream is received from the user providing assistance. In a step 650, a modified rendered video stream is transmitted toward the user requesting assistance. The modified vide stream has been modified based on the at least one modification. The method ends in an end step 660.

Those skilled in the art to which this application relates will appreciate that other and further additions, deletions, substitutions and modifications may be made to the described embodiments.

What is claimed is:

1. A system for providing real-time assistance regarding a cloud-based application, comprising:
   an assistance request receiver operable to receive from a user requesting assistance an assistance request regarding said cloud-based application;
   a rendered video stream diverter associated with said assistance request receiver and operable to reroute an original rendered video stream associated with said user requesting assistance to a user providing assistance; and
   a modification receiver associated with said assistance request receiver and operable to receive from said user providing assistance at least one modification regarding said original rendered video stream without having to modify said cloud-based application, a stream transmitter associated with said modification receiver operable to transmit a modified rendered video stream toward said user requesting assistance that has been modified based on said at least one modification.

2. The system as recited in claim 1 wherein said assistance request receiver is further operable to limit distribution of said assistance request to users selected from the group consisting of:
   other current users of said cloud-based application, and
   friends of said user requesting assistance.

3. The system as recited in claim 1 wherein said at least one modification includes a visual cue superimposed on frames of said original rendered video stream to yield said modified rendered video stream.

4. The system as recited in claim 3 wherein said visual cue is selected from the group consisting of:
   a text comment, and
   a graphical character.

5. The system as recited in claim 1 wherein said at least one modification includes audible assistance superposed on audio of said original rendered video stream to yield said modified rendered video stream.

6. The system as recited in claim 1 wherein said at least one modification includes commands made to said cloud-based application by said user providing assistance on behalf of said user requesting assistance.

7. The system as recited in claim 1 wherein said cloud-based application is a cloud game.

8. A method of providing real-time assistance regarding a cloud-based application, comprising:
   receiving from a user requesting assistance an assistance request regarding said cloud-based application;
   rerouting an original rendered video stream associated with said user requesting assistance to a user providing assistance;
   receiving from said user providing assistance at least one modification regarding said original rendered video stream without having to modify said cloud-based application; and
   transmitting a modified rendered video stream toward said user requesting assistance that has been modified based on said at least one modification.

9. The method as recited in claim 8 further comprising limiting distribution of said assistance request to users selected from the group consisting of:
   other current users of said cloud-based application, and
   friends of said user requesting assistance.

10. The method as recited in claim 8 wherein said at least one modification includes a visual cue superimposed on frames of said original rendered video stream to yield said modified rendered video stream.

11. The method as recited in claim 10 wherein said visual cue is selected from the group consisting of:
    a text comment, and
    a graphical character.

12. The method as recited in claim 8 wherein said at least one modification includes audible assistance superposed on audio of said original rendered video stream to yield said modified rendered video stream.

13. The method as recited in claim 8 wherein said at least one modification includes commands made to said cloud-based application by said user providing assistance on behalf of said user requesting assistance.

14. The method as recited in claim 8 wherein said cloud-based application is a cloud game.

15. An application server, comprising:
- an application core executable on a central processing unit;
- a video renderer associated with said application core and executable on a graphics processing unit;
- a stream transmitter associated with said video renderer and operable to transmit a plurality of video streams toward application users;
- an assistance request receiver associated with said application core and operable to receive from a user requesting assistance an assistance request regarding a cloud-based application;
- a rendered video stream diverter associated with said stream transmitter and operable to reroute an original rendered video stream associated with said user requesting assistance to a user providing assistance; and
- a modification receiver associated with said application core and operable to receive from said user providing assistance at least one modification regarding said original rendered video stream without having to modify said cloud-based application, said stream transmitter further operable to transmit a modified rendered video stream toward said user requesting assistance that has been modified based on said at least one modification.

16. The server as recited in claim 15 wherein said assistance request receiver is further operable to limit distribution of said assistance request to users selected from the group consisting of:
- other current users of said cloud-based application, and
- friends of said user requesting assistance.

17. The server as recited in claim 15 wherein said at least one modification includes a visual cue superimposed on frames of said original rendered video stream to yield said modified rendered video stream.

18. The server as recited in claim 17 wherein said visual cue is selected from the group consisting of:
- a text comment, and
- a graphical character.

19. The server as recited in claim 15 wherein said at least one modification includes audible assistance superposed on audio of said original rendered video stream to yield said modified rendered video stream.

20. The server as recited in claim 15 wherein said at least one modification includes commands made to said cloud-based application by said user providing assistance on behalf of said user requesting assistance.

* * * * *

UNITED STATES PATENT AND TRADEMARK OFFICE
CERTIFICATE OF CORRECTION

PATENT NO.       : 9,813,254 B2
APPLICATION NO.  : 14/017695
DATED            : November 7, 2017
INVENTOR(S)      : Andrew Fear Page 1 of 1

It is certified that error appears in the above-identified patent and that said Letters Patent is hereby corrected as shown below:

In the Specification

In Column 1, Line 30, after --individuals and-- delete "garners" and insert --gamers--

Signed and Sealed this
Twenty-ninth Day of May, 2018

Andrei Iancu
*Director of the United States Patent and Trademark Office*